United States Patent

Prechtel et al.

[11] Patent Number: 5,601,205
[45] Date of Patent: Feb. 11, 1997

[54] FUEL TANK ASSEMBLY

[75] Inventors: Alan R. Prechtel, Pulheim-Brauweiler, Germany; Michael J. Boehk, Ypsilanti, Mich.; Daniel J. Kmiecik, Dearborn Heights, Mich.; Danny P. Forbes, Belleville, Mich.

[73] Assignee: Ford Motor Company, Dearborn, Mich.

[21] Appl. No.: 617,725

[22] Filed: Apr. 1, 1996

[51] Int. Cl.$^6$ ..................................................... B65D 45/28
[52] U.S. Cl. ......................... 220/562; 220/295; 220/300; 220/DIG. 16
[58] Field of Search .................................... 200/300, 295, 200/296, 562, 89.1, DIG. 16, DIG. 32, DIG. 33

[56] References Cited

U.S. PATENT DOCUMENTS

| | | |
|---|---|---|
| 3,500,858 | 3/1970 | Metcalf . |
| 3,875,654 | 4/1975 | Ushijima . |
| 4,416,391 | 11/1983 | Sarrazin ................................... 220/304 |
| 4,530,442 | 7/1985 | Vogel, Jr. et al. . |
| 4,544,007 | 10/1985 | Abraham ......................... 220/DIG. 33 |
| 4,667,842 | 5/1987 | Collins . |
| 4,753,262 | 6/1988 | Bergsma . |
| 4,994,673 | 1/1985 | Hiraishi ................................... 220/288 |
| 5,014,813 | 5/1991 | Fussell . |
| 5,096,154 | 3/1992 | Ellis ................................. 220/DIG. 33 |
| 5,139,043 | 8/1992 | Hyde et al. . |
| 5,325,716 | 7/1994 | Hafner et al. . |
| 5,381,919 | 1/1995 | Griffin et al. ......................... 220/89.1 . |
| 5,385,256 | 1/1995 | Brown ..................................... 220/323 |

FOREIGN PATENT DOCUMENTS 2027454  1/1972  Germany .

*Primary Examiner*—Joseph M. Moy
*Attorney, Agent, or Firm*—Raymond L. Coppiellie

[57] ABSTRACT

A fuel tank assembly is provided. The fuel tank assembly includes a plastic fuel tank having a wall defining an outer surface and an interior volume for storing fuel therein. A portion of the fuel tank wall further defines a generally cylindrical opening therethrough. The fuel tank assembly also includes an instrument having a generally cylindrical piece extending through the opening in the fuel tank wall such that the instrument communicates with the interior volume of the fuel tank. A retainer assembly is attached to the outer surface of the fuel tank wall for releasably securing the instrument to the fuel tank. The retainer assembly includes a plastic ring-like member having a generally cylindrical inner wall disposed around the generally cylindrical piece of the instrument, the inner wall defining a circumferentially extending sealing surface. The retainer assembly also includes a reinforcing member carried within the ring-like member adjacent to and generally concentric with the sealing surface. A sealing member is interposed between the generally cylindrical piece of the instrument and the sealing surface of the retainer assembly.

15 Claims, 2 Drawing Sheets

FUEL TANK ASSEMBLY

BACKGROUND OF THE INVENTION

1. Field of the Invention

The present invention relates generally to a fuel tank assembly and; more particularly, to a fuel tank assembly in which an instrument is releasably secured to the fuel tank by a reinforced retainer ring.

2. Description of Related Art

An automotive fuel tank assembly commonly includes a fuel tank having various instruments, such as vapor vent valves, pressure transducers, fuel senders, and the like, attached thereto. Often, these instruments are positioned such that they extend through openings in the fuel tank wall to communicate with both the inside and the outside of the fuel tank.

Various means for securing the instruments to the fuel tank are known. For example, it is known to attach a vapor vent valve to a plastic fuel tank by inserting the valve into a large rubber grommet positioned over an opening in the tank. The grommet envelops a portion of a plastic ring welded to the fuel tank wall around the opening and is thereby held in place over the opening. One drawback of this approach is that the large, irregularly-shaped grommet is a relatively expensive sealing mechanism. Another drawback of the approach is that the grommet must generally be lubricated to facilitate insertion of the valve.

A second approach for attaching a vapor vent valve to a plastic fuel tank is disclosed in U.S. Pat. No. 5,139,043. The patent describes a vapor vent valve that is directly welded to the outer surface of the fuel tank wall. While this approach eliminates the need for a grommet and the problems associated therewith, a welded valve is, nevertheless, undesirable from a servicing standpoint.

A need therefore exists for a fuel tank assembly having retaining and sealing means for securing instruments to the fuel tank, which means are not only reliable and low in cost but which also enable the instruments to be easily removed from the fuel tank for servicing.

SUMMARY OF THE INVENTION

The present invention provides a fuel tank assembly which satisfies the above-described need. The fuel tank assembly comprises a plastic fuel tank having a wall defining an outer surface and an interior volume for storing fuel therein. A portion of the fuel tank wall further defines a generally cylindrical opening therethrough. The fuel tank assembly also comprises an instrument having a generally cylindrical piece extending through the opening in the fuel tank wall such that the instrument communicates with the interior volume of the fuel tank. A retainer assembly is attached to the outer surface of the fuel tank wall for releasably securing the instrument to the fuel tank. The retainer assembly includes a plastic ring-like member having a generally cylindrical inner wall disposed around the generally cylindrical piece of the instrument, the inner wall defining a circumferentially extending sealing surface. The retainer assembly also includes a reinforcing member carried within the ring-like member adjacent to and generally concentric with the sealing surface. A sealing member is interposed between the generally cylindrical piece of the instrument and the sealing surface of the retainer assembly for preventing fuel vapors from escaping between the instrument and the sealing surface.

It is an advantage of the present invention to provide a fuel tank assembly having means for removably attaching an instrument to a fuel tank wall.

It is a further advantage of the present invention to dispose a retainer assembly around the instrument, the retainer assembly comprising a plastic ring-like member with a circumferentially extending sealing surface and a reinforcing member. The reinforcing member increases the dimensional stability of the plastic sealing surface such that only a small sealing member need be positioned between the instrument and the sealing surface.

These and other features and advantages of the present invention will be more fully described below with reference to the following detailed description and drawings.

DETAILED DESCRIPTION OF PREFERRED EMBODIMENTS

Figure 1:
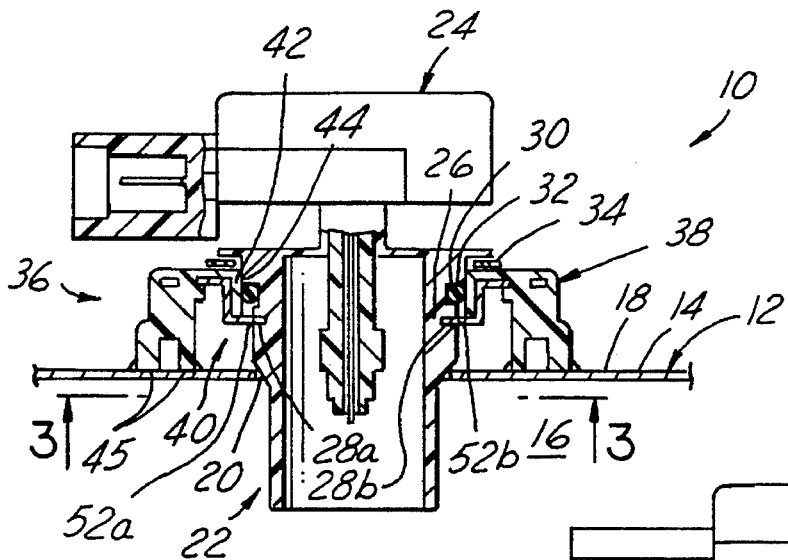
FIG. 1 is a partial cross-sectional view of a fuel tank assembly according to the present invention, wherein a retainer assembly is used to releasably secure an instrument to the fuel tank.

Referring now to the drawings, FIG. 1 depicts a fuel tank assembly 10, particularly suited for use in an automotive vehicle. As illustrated in FIG. 1, fuel tank assembly 10 includes a plastic fuel tank 12 having a wall 14 that defines an interior volume 16 for storing fuel therein. While various fuel tank constructions are possible, fuel tank 12 preferably has a multilayered construction, including at least one hydrocarbon barrier layer, such as ethylene vinyl alcohol, to minimize the permeation of hydrocarbons through the tank. The outermost layer of fuel tank 12, which defines the outer surface 18 of wall 14, is preferably made from high-density polyethylene (HDPE). The innermost layer of fuel tank 12 is likewise also preferably made of HDPE. As further illustrated in FIG. 1, a portion of wall 14 defines a generally cylindrical opening 20 in tank 12.

Figure 2:
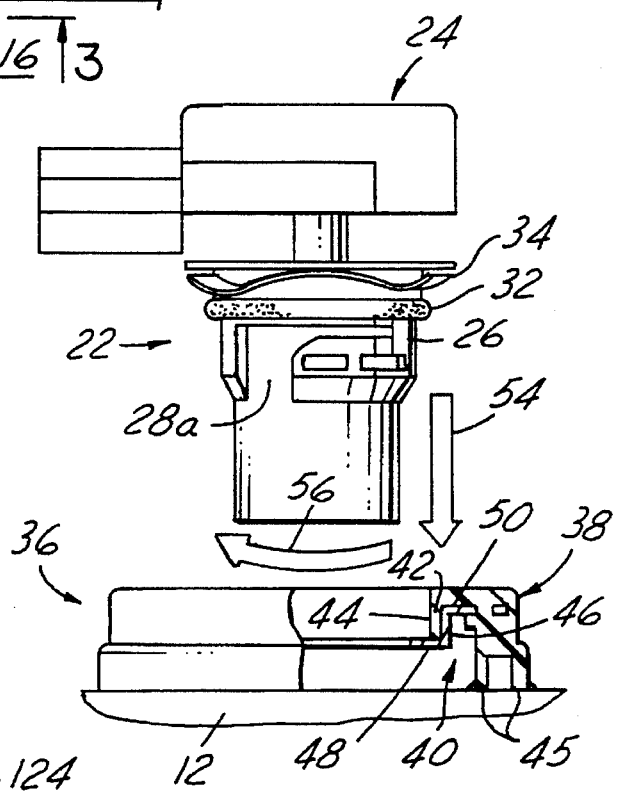
FIG. 2 is a side view, shown in partial section, of the instrument and retainer assembly of FIG. 1.

Opening 20 is adapted to receive a generally cylindrical piece 22 of an instrument, such as pressure transducer 24. Transducer 24, once inserted through opening 20, communicates with interior volume 16 of tank 12 and, in conventional fashion, measures the tank's internal vapor pressure. As best illustrated in FIGS. 1–2, generally cylindrical piece 22 of transducer 24 preferably includes a circumferentially extending raised portion 26. Raised portion 26 preferably defines a pair of generally L-shaped slots 28a, 28b. Raised portion 26 also preferably defines a circumferentially extending seat 30 for carrying a sealing member 32 thereon. As illustrated in FIG. 2, sealing member 32 is preferably a simple O-ring. A conventional spring washer, such as wavy washer 34, may be positioned around raised portion 26 adjacent sealing member 32. Pressure transducer 24, sealing member 32 and washer 34 together comprise a subassembly manufactured by Motorola and designated by the assignee of the present invention as Ford Part No. F6DE-9C052-B1A.

A retainer assembly 36 is used to releasably secure pressure transducer 24 to fuel tank 12. As illustrated in FIGS. 1–2, retainer assembly 36 comprises a plastic ring-like member 38 and a reinforcing member 40. Ring-like member 38 includes means for connecting retainer assembly 36 to fuel tank 12, such as weld feet 45. Ring-like member 38 also includes a generally cylindrical inner wall 42, which is disposed around generally cylindrical piece 22 of transducer 24 and defines a circumferentially extending sealing surface 44. Reinforcing member 40 is carried within ring-like member 38 adjacent to and generally concentric with sealing surface 44. Preferably, reinforcing member 40 includes an axial portion 46 extending generally parallel to sealing surface 44, a first radial portion 48 extending radially inward from one end of axial portion 46, and a second radial portion 50 extending radially outward from the other end of axial portion 46. Reinforcing member 40 is preferably a metal insert, joined to ring-like member 38 through conventional insert molding techniques. Axial portion 46 of reinforcing member 40 reinforces sealing surface 44 of ring-like member 38 during the molding thereof, such that the plastic material is less prone to shrinkage and need not be machined prior to use. Axial portion 46 also reinforces sealing surface 44 during use, such that the surface remains highly stable over time. Radial portion 48 of reinforcing member 40 preferably extends radially inward of sealing surface 44 and includes a pair of tabs 52a and 52b keyed to releasably engage slots 28a and 28b of transducer 24, respectively.

Figure 3:
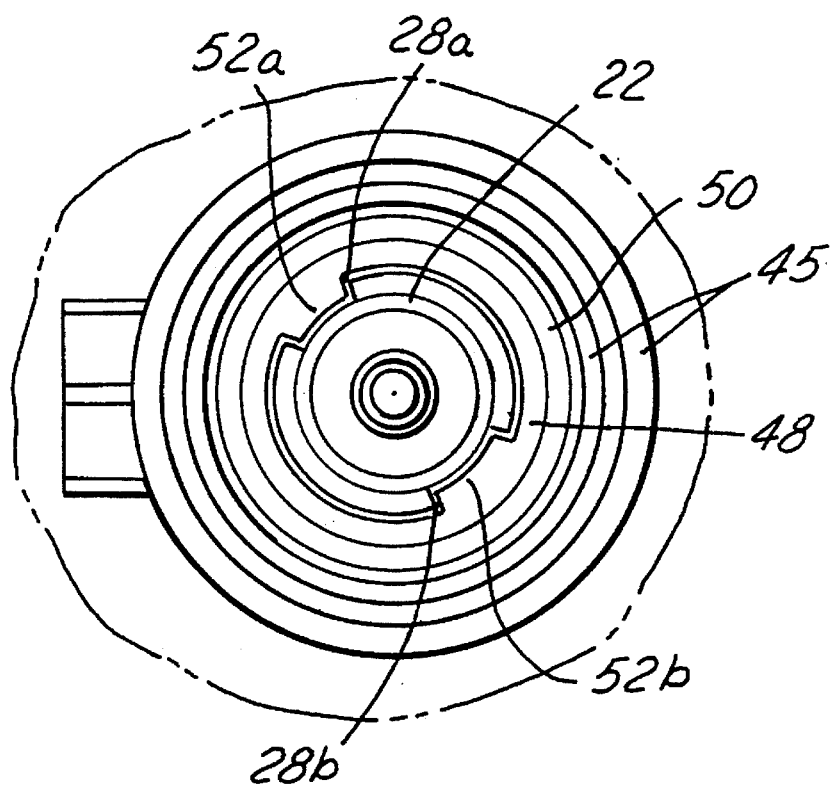
FIGS. 3 and 4 are bottom views of the instrument and retainer assembly of FIG. 1, illustrating the connection therebetween.
Figure 4:
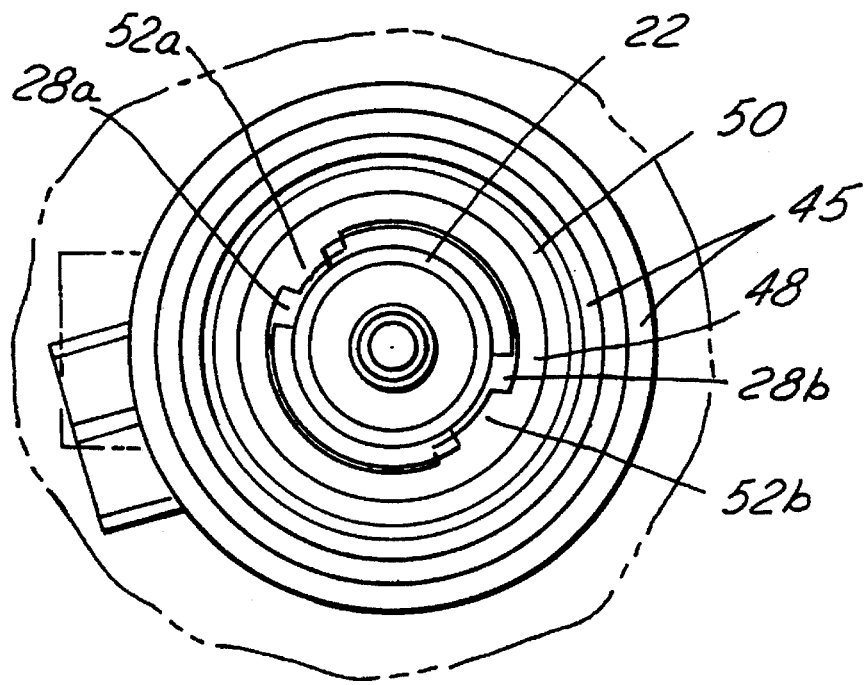

In assembling fuel tank assembly 10, retainer assembly 36 is fixedly mounted about opening 20 in fuel tank 12. This step is preferably accomplished by hot plate welding weld feet 45 to outer surface 18 of tank 12, though other attachment methods may be used. To ensure a strong weld bond between outer surface 18 of tank 12 and weld feet 45 of ring-like member 38, outer surface 18 and weld feet 45 are preferably made of the same polymeric material, e.g., polyethylene. As best illustrated in FIGS. 2–4, pressure transducer 24 is fitted into opening 20 of fuel tank 12 by aligning slots 28a, 28b of the transducer with tabs 52a, 52b of retainer assembly 36. By first urging transducer 24 in the direction indicated by arrow 54 in FIG. 2, and then rotating transducer 24 in the direction indicated by arrow 56, transducer 24 is locked in place by tabs 52a, 52b of retainer assembly 36. Such an attachment is commonly referred to in the art as a cam-lock assembly. Transducer 24 may be easily removed from tank 12 by simply reversing the order and direction of the urging and rotating steps. Proper assembly of transducer 24 to tank 12 may be facilitated by sizing tabs 52a, 52b such that one is larger than the other. In this way, tabs 52a, 52b will each only fit in one or the other of keyed slots 28a, 28b. Upon lockingly engaging tabs 52a, 52b with slots 28a, 28b, sealing member 32 is positioned in sealing engagement between transducer 24 and plastic sealing surface 44 of retainer assembly 36. Sealing member 32 is preferably made from a fuel-resistant material, such as a fluoroelastomer. For automotive applications, fluoroelastomers having a polymeric backbone of about 70 w % fluorine are particularly preferred. Wavy washer 34 is used to improve the tightness of the seal.

Figure 5:
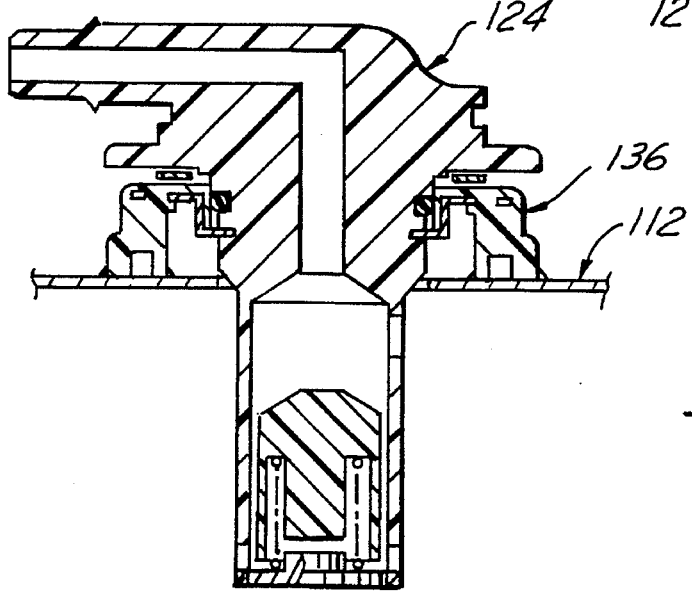
FIG. 5 is cross-sectional view of an alternative embodiment of a fuel tank assembly according to the present invention.

Turning now to FIG. 5, an alternative embodiment of a fuel tank assembly 110 according to the present invention is shown. Fuel tank assembly 110 is substantially similar to fuel tank assembly 10 described above except that the instrument 124 secured by retainer assembly 136 to fuel tank 112 is a vapor vent valve.

While the invention has been shown and described in its preferred embodiments, it will be clear to those skilled in the arts to which it pertains that many changes and modifications may be made thereto without departing from the scope of the invention. Modifications which fall within the true scope of this invention are intended to be included within the terms of the appended claims.

What is claimed:

1. A fuel tank assembly, comprising:
   a plastic fuel tank having a wall defining an outer surface and an interior volume for storing fuel therein, a portion of said wall further defining a generally cylindrical opening therethrough;
   an instrument having a generally cylindrical piece extending through said opening in said fuel tank wall such that said instrument communicates with said interior volume of said fuel tank;
   a retainer assembly attached to the outer surface of said fuel tank wall for releasably securing said instrument to said fuel tank, said retainer assembly including:
      a plastic, ring-like member having a generally cylindrical inner wall disposed around said generally cylindrical piece of said instrument, said inner wall defining a circumferentially extending sealing surfaced and
      a reinforcing member carried within said ring-like member adjacent to and generally concentric with said sealing surface; and
   a sealing member interposed between said generally cylindrical piece of said instrument and said sealing surface of said retainer assembly for preventing fuel vapors from escaping between said instrument and said sealing surface.

2. A fuel tank assembly according to claim 1, wherein said instrument is a pressure transducer.

3. A fuel tank assembly according to claim 1, wherein said instrument is a vapor vent valve.

4. A fuel tank assembly according to claim 1, wherein said reinforcing member includes an axial portion extending generally parallel to said sealing surface and a first radial portion extending from said axial portion radially inward of said sealing surface.

5. A fuel tank assembly according to claim 4, wherein said first radial portion of said reinforcing member includes a pair of inwardly extending tabs and said instrument includes a pair of keyed slots, each one of said pair of tabs being releasably engaged with one of said pair of keyed slots.

6. A fuel tank assembly according to claim 4, wherein said reinforcing member further includes a second radial portion extending radially outward from said axial portion.

7. A fuel tank assembly according to claim 6, wherein said reinforcing member is a metal insert.

8. A fuel tank assembly according to claim 1, wherein said sealing member is carried on said generally cylindrical piece of said instrument.

9. A fuel tank assembly according to claim 8, wherein said sealing member is an O-ring.

10. A fuel tank assembly, comprising:
    a plastic fuel tank having a wall defining an outer surface and an interior volume for storing fuel therein, a portion of said wall further defining a generally cylindrical opening therethrough;
    a pressure transducer having a generally cylindrical piece extending through said opening in said fuel tank wall such that said pressure transducer communicates with said interior volume of said fuel tank;
    a retainer assembly attached to the outer surface of said fuel tank wall for releasably securing said pressure transducer to said fuel tank, said retainer assembly including:
- a plastic, ring-like member having a generally cylindrical inner wall disposed around said generally cylindrical piece of said pressure transducer, said inner wall defining a circumferentially extending sealing surface, and
- a metal reinforcing member carried within said ring-like member adjacent to and generally concentric with said sealing surface; and a sealing member interposed between said generally cylindrical piece of said pressure transducer and said sealing surface of said retainer assembly for preventing fuel vapors from escaping between said pressure transducer and said sealing surface.

11. A fuel tank assembly according to claim 10, wherein said reinforcing member includes an axial portion extending generally parallel to said sealing surface and a first radial portion extending from said axial portion radially inward of said sealing surface.

12. A fuel tank assembly according to claim 11, wherein said first radial portion of said reinforcing member includes a pair of inwardly extending tabs and said pressure transducer includes a pair of keyed slots, each one of said pair of tabs being releasably engaged with one of said pair of keyed slots.

13. A fuel tank assembly according to claim 11, wherein said reinforcing member further includes a second radial portion extending radially outward from said axial portion.

14. A fuel tank assembly according to claim 10, wherein said sealing member is carried on said generally cylindrical piece of said pressure transducer.

15. A fuel tank assembly according to claim 14, wherein said sealing member is an O-ring.

* * * * *